UNITED STATES PATENT OFFICE.

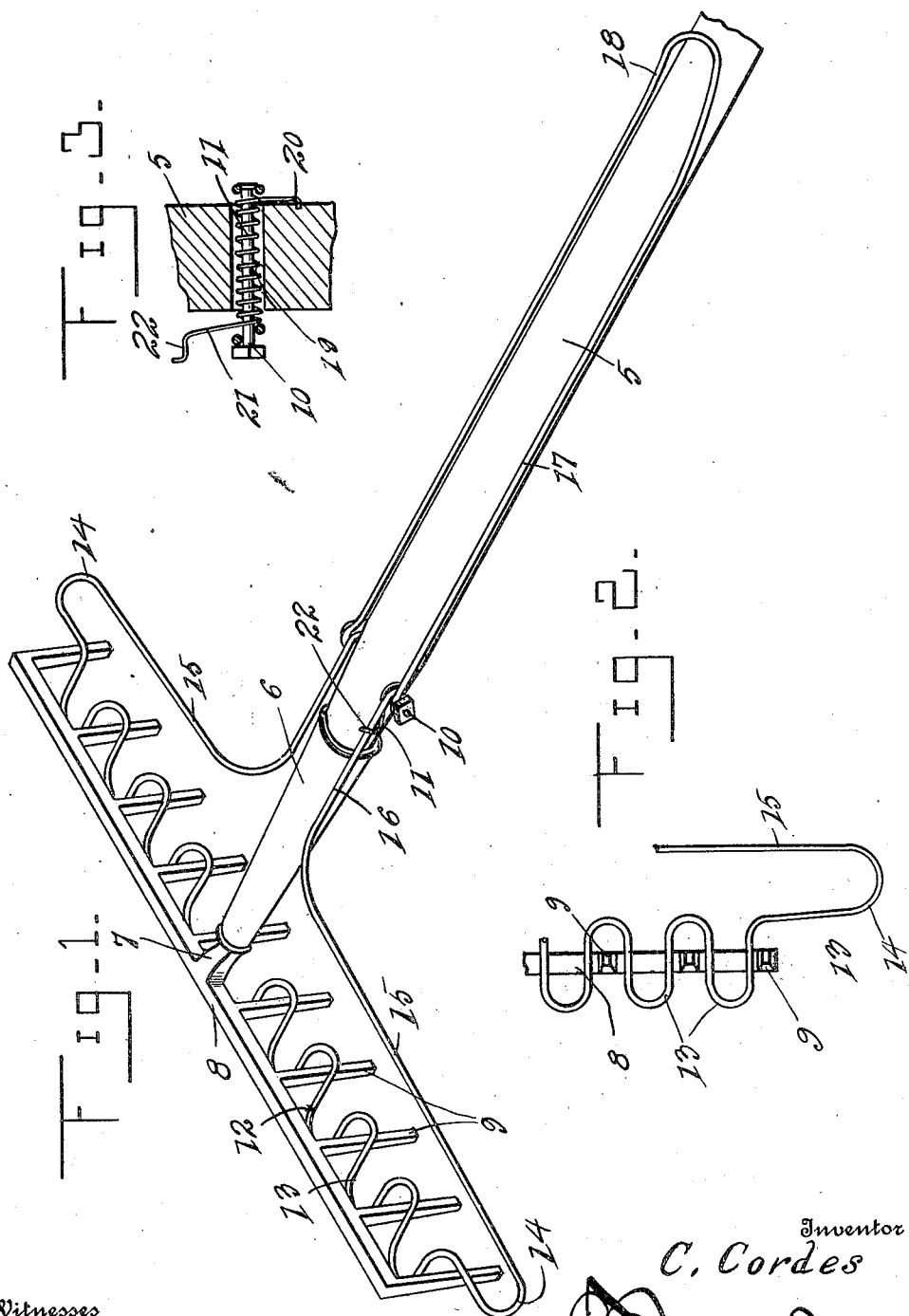

CHARLES CORDES, OF BROOKLYN, NEW YORK.

RAKE-CLEANER.

1,092,024.  Specification of Letters Patent.  Patented Mar. 31, 1914.

Application filed June 30, 1913. Serial No. 776,677.

*To all whom it may concern:*

Be it known that I, CHARLES CORDES, a citizen of the United States, residing at Brooklyn, in the county of Kings and State of New York, have invented certain new and useful Improvements in Rake-Cleaners; and I do hereby declare the following to be a full, clear, and exact description of the invention, such as will enable others skilled in the art to which it appertains to make and use the same.

This invention relates to new and useful improvements in rake cleaners and has for its object the provision of a device of the above character which may be easily and quickly attached to a rake of ordinary construction without in any way necessitating the changing of the construction of such rake.

Another object of my invention is the provision of a device which will strip the teeth of an ordinary garden rake of any trash which may have gathered thereon.

A still further object of my invention is the provision of a stripping bar which may be quickly and easily operated by a lever and which will be returned to its normal position automatically.

Still another object of my invention is the provision of a device of the above character which will be composed of a single piece of wire and looped and bent in such a way that all the teeth of the rake will be stripped of trash simultaneously.

With the above and other objects in view I now proceed to describe my invention in the following specification and accompanying drawings, in which, Figure 1 is a perspective view of a rake showing my improved cleaner applied thereto, Fig. 2 is a detail fragmental view of a rake showing my cleaner applied thereto, and Fig. 3 is a sectional view taken through the handle of the rake and showing the spring which returns the cleaner to its normal raised position.

Referring to the drawings by characters of reference 5 indicates the handle of an ordinary rake having secured at the outer end thereof the usual sleeve 6 which is tapered as clearly illustrated in the drawings and surrounds the shank 7 of a suitable rake head 8. Formed integral with this rake head 8 and extending downwardly therefrom I provide the usual teeth 9 which are spaced in the ordinary manner and provided with substantially sharp points.

My improved cleaning attachment, which is clearly illustrated in the drawings, preferably comprises the three members, namely, the bolt 10, spring 11 and a cleaning bar, indicated by the numeral 12. This cleaning bar 12 is preferably bent as shown to form the outwardly extending projections 13 which extend between the teeth of the rake and in close proximity thereto. At the ends of the cleaning bar I preferably provide the outstanding members 14 which are bent rearwardly as illustrated at 15. These portions 15 preferably extend, as clearly shown, in a plane parallel with the head of the rake and terminate at their extremities in the rearwardly extending portions 16 which in turn extend parallel with the handle of the rake for a short distance, at which point they are coiled as clearly illustrated and extend around the bolt 10. The ends of the coils are then extended rearwardly as shown at 17 and bent upwardly at 18 to form a handle portion, by means of which the lever formed by the members 17 is adapted to be raised, thus causing the stripping member 12 to pass downwardly over the teeth and thereby strip said teeth of any trash which may have gathered thereon during the process of raking.

The spring referred to as 11 preferably extends through the transverse aperture 19 formed in the rake handle and has one end secured to said handle as clearly illustrated at 20. The end of the spring opposite the end 20 is preferably extended as shown at 21 and terminates in a hook portion 22 which is adapted to engage one of the extensions 16 on which the lever comprising the members 17 is formed. It will be clearly seen that in this way the spring forms a bearing for the bolt and also acts against the bar to return the same to its normal upward position.

When it is desired to make use of my improved rake cleaner the rake is used in the ordinary manner and when the teeth become clogged the only operation necessary is the lifting of the lever formed by the members 17 which will cause the stripping bar to descend with relation to the rake teeth and in that way force the trash from the ends of the teeth and leave the teeth in their normal clean condition.

While in the foregoing I have shown and described the preferred embodiment of my invention, I wish it to be understood that I may change the specific arrangement of parts without in any way departing from the spirit and scope of my invention.

What I claim is:—

1. A device of the character described comprising a single piece of wire bent to form outstanding members, extensions projecting rearwardly from the outstanding members, said extensions being bent inwardly, angular extensions at the innermost extremities of the aforesaid extensions, said angular extensions terminating in loops, the ends of the loops opposite the angular extensions lying parallel with the handle of a rake, a bolt extending through the loops and providing a pivot, and a spring adapted to exert pressure against the angular extensions and normally holding the bar in its raised position.

2. In combination with a rake, a cleaner comprising a stripping bar, said stripping bar comprising a wire being bent to form outwardly extending projections, said outwardly extending projections adapted to lie between the teeth of the rake, the ends of the stripping bar being bent rearwardly and extending inwardly to a point substantially in the center of the stripping bar, angular extensions formed integral with the aforesaid extensions, said angular extensions terminating in loops, a bolt adapted to extend through the loops and through an aperture in the rake handle, a spring surrounding said bolt, one end of said spring being secured to the rake handle and the opposite end of said spring being adapted to exert upward pressure against one of the angular extensions and thereby normally hold the cleaner in its raised position.

3. In combination with a rake, a cleaner comprising a lever, loops formed intermediate the ends of said lever, a bolt extending through said loops and through an aperture in the rake handle, angular projections extending outwardly from the ends of the lever, said angular projections terminating at a point slightly beyond the lateral extremities of the rake head and being bent inwardly, outwardly extending projections formed integral with the aforesaid projections, said outwardly extending projections being adapted to lie between the rake teeth, a spring adapted to extend through said aperture in the rake handle and have one end secured thereto, said spring forming a bearing for the bolt, and a hook formed at the end of the spring opposite the attached end and adapted to exert upward pressure against the outer end of the lever and normally hold the cleaner in its raised position.

In testimony whereof I affix my signature in presence of two witnesses.

CHARLES CORDES.

Witnesses:
 FRANK B. POTTER,
 HENRY MAHLMANN.